United States Patent Office 3,256,898
Patented June 21, 1966

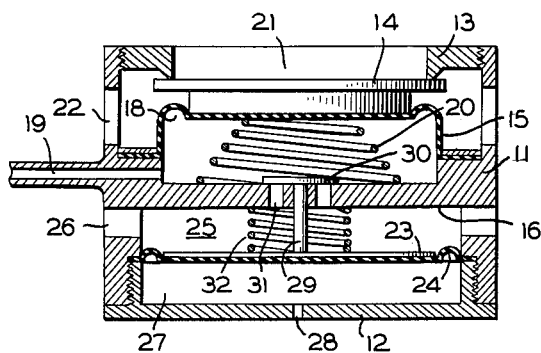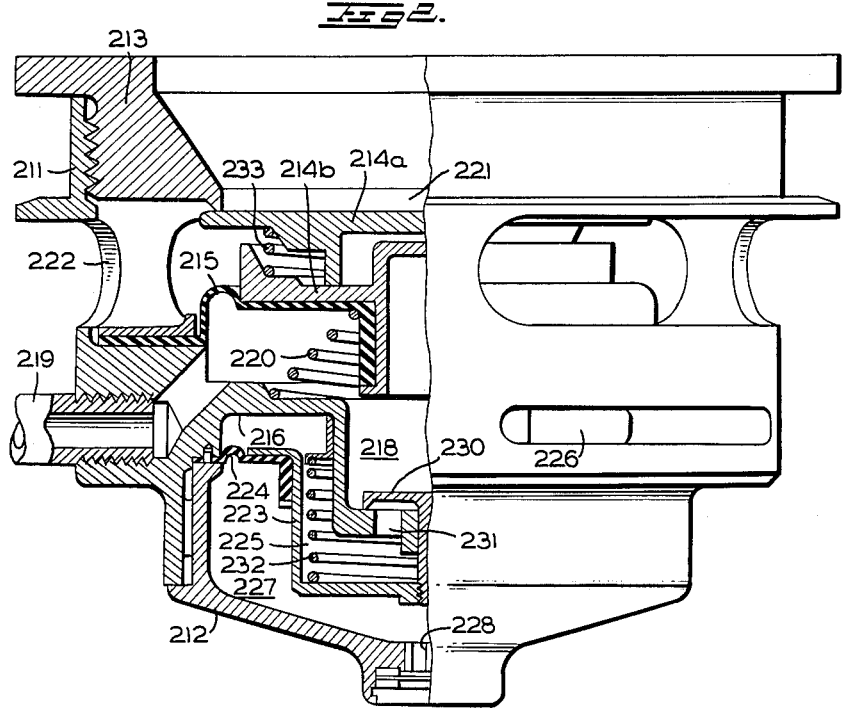

3,256,898
COMPENSATED EXPIRATORY VALVES
Eric T. Ringrose, Hawley, near Camberley, England, assignor to British Executive and General Aviation Limited, London, England, a British company
Filed July 17, 1962, Ser. No. 210,391
2 Claims. (Cl. 137—64)

This invention relates to compensated expiratory valves, and concerns particularly such valves used in the oxygen mask of a pilot of an aeroplane.

In the known compensated expiratory valves, such as are used in pressure demand oxygen equipment for high altitude pressurized aircraft, the valve includes a compensating pressure compartment, to which a branch from the oxygen supply pipe is connected to provide compensating pressure and which is separated from the oxygen mask by a resiliently mounted diaphragm; the diaphragm being movable by excess pressure in the mask from a position whereat it prevents communication between the mask and exhaust ports to a position where such comunication takes place. When an aircraft is flying at an altitude where cabin pressurization is necessary and in the event of the cabin being punctured, these known compensated expiratory valves do not allow exhalation from the respiratory tract during the subsequent rapid reduction in cabin pressure. During such decompressions the gases within the lungs expand and, if the ratio in the change of pressure to the initial pressure exceeds a certain value, this expansion cannot be accommodated within the respiratory tract without damage to the lungs, therefore, in order to reduce the likelihood of lung damage during a rapid decompression, there should be free venting of the respiratory tract whilst the cabin pressure is falling. If the reduction of cabin pressure occurs very rapidly (for example, within 0.1 second) then the exhalation from the respiratory tract persists for some time after the pressure change is complete and venting should continue for this period.

The object of the invention is to provide an improved compensated expiratory valve which overcomes this limitation of the known valves and satisfies the above conditions.

According to the invention, the compensated pressure compartment of a compensated expiratory valve includes a further valve openable by a rapid reduction of external pressure to allow the compensating pressure to vent to ambient.

When the compensating pressure vent to ambient, the balance of pressure across the diaphragm is destroyed, the diaphragm moves to allow free communication between the mask and the exhaust ports, and thereby allows free exhalation from the respiratory tract.

Furthermore, according to the invention, the said further valve is openable by a secondary diaphragm resiliently mounted in a chamber and dividing the chamber into two compartments, a first compartment freely communicating with the exterior of the chamber, and a second compartment communicating with the exterior of the chamber through a restriction or bleed hole.

During a rapid drop in external pressure, the second compartment will tend to retain a relatively higher pressure than the first compartment and the pressure differential across the secondary diaphragm will move the diaphragm to open the compensating pressure venting valve. Preferably, the chamber in which the secondary diaphragm is mounted is adjacent to the compensating pressure compartment, and the compensating pressure venting valve comprises a mushroom valve having a stem passing through and guided by a partition wall dividing the chamber from the compensating pressure compartment.

The mushroom valve may be urged to the closed position by a light spring, and the diaphragm separating the compensating pressure compartment from the mask (hereinafter termed the primary diaphragm) may be urged to the position whereat it prevents communication between the masks and the exhaust ports by a second light spring.

The valve body may be of cylindrical form and the primary diaphragm may consist of a rigid disc mounted on a resilient mounting such as rubber, and likewise the secondary diaphragm may be of a rigid disc construction and mounted upon a resilient mounting. The valve body, the mushroom valve and the diaphragm disc may be made of light alloy.

The invention will be described, by way of example, with reference to the accompanying drawings in which, FIGURE 1 is a diagrammatic section of an improved compensated expiratory valve, and FIGURE 2 is a partially sectioned elevation of an actual valve suitable for use in conjunction with an oxygen mask.

Referring to FIGURE 1, the valve has a cylindrical body 11 having an end cap 12 and a valve seating 13. A primary diaphragm (comprising a rigid valve disc 14 and a resilient mounting 15), a partition wall 16, and the body 11, define a compensating pressure compartment 18 to which a branch of the oxygen, or air and oxygen mixture, supply 19 is connected to provide the compenating pressure. The valve disc 14 is urged against the valve seating 13 by a light spring 20 and thereat it prevents communication between an orifice 21 and adjacent exhaust ports 22 which are formed circumferentially in the valve body.

In the chamber formed by the partition wall 16, the end cap 12 and the body 11, is a secondary diaphragm which comprises a rigid disc 23 and a resilient mounting 24. It will be seen that the secondary diaphragm divides the said chamber into two compartments, the first compartment 25 freely communicates with the exterior of the valve by means of secondary exhaust ports 26 formed circumferentially in the valve body 11 whilst the second compartment 27 is provided with a bleed hole 28. Attached to the disc 23 is the stem 29 of a mushroom valve having a head 30 which may close compensating pressure venting ports 31 formed in the partition wall 16. A light spring 32 is arranged to bias the mushroom valve to the closed position.

When the valve is employed in an oxygen mask the valve is sealed to the mask around the periphery of the orifice 21 and a branch of the oxygen pipe 19 provides the compensating pressure to the underside of the primary diaphragm as hereinbefore described. This pressure is equal to the pressure applied to the mask, as the effective areas of the orifice 21 and of the primary diaphragm are equal.

During normal flight conditions, the head 30 of the mushroom valve 31 will be in its closed position sealing off the gas outlet 31 and the valve will perform as an ordinary compensated expiratory valve. If, however, the aircraft is flying at an altitude where cabin pressurization is necessary and the cabin is punctured, with subsequent loss of cabin pressure, the pressure in the first compartment 25 will fall at a similar rate to the loss of cabin pressure, owing to free venting through the secondary exhaust ports 26. The pressure in the second compartment 27 will, however, be reduced at a slower rate due to the restriction of flow imposed by the bleed hole 28. The resulting pressure differential across the secondary diaphragm causes it to be deflected towards the first compartment 25 thereby lifting the mushrom valve head 30 and opening the compensating pressure venting ports 31. Thus the balance of pressures across the primary diaphragm is destroyed and the valve disc 14 moves away from the seating 13 allowing free communication between the mask and the exhaust ports 22 which thereby permits free exhalation from the respiratory tract.

When the pressures in the first and second compartments 25 and 27 are equalized the spring 32 forces the secondary diaphragm towards the second compartment 27 and thereby moves the mushroom valve head 30 to close the venting ports 31. The pressure in compartment 18 then builds up and restores the compensating effect of the valve.

In FIGURE 2, the valve ports are equivalent to those shown in FIGURE 1 and corresponding parts have been given the same reference numeral as FIGURE 1 preceded by the numeral "2". As the operations and functions of the valve are similar to those hereinbefore described a reiteration is not considered to be necessary. It will, however, be noticed that the valve disc of the primary diaphragm comprises two component discs 214a and 214b between which is located a spring 233. The division of the diaphragm ensures, in the event of the oxygen supply failing with consequent loss of compensating pressure, that the valve disc 214a does not leave the seating 213 and thereby allow the pilot unknowingly to breathe air.

An improved compensated expiratory valve, as hereinbefore described, is also suitable for use in conjunction with a partial pressure helmet which encloses the head and neck of the pilot. However, in this latter case, the compensating pressure inlet to the compartment 18 or 218 is preferably a small bleed hole formed in the primary diaphragm and the effective area of the diaphragm is larger than the area of the orifice 21 or 221 in order to bias the diaphragm towards the closed position.

I claim:
1. A compensated expiratory valve for breathing apparatus of the type adapted to supply oxygen from a pressurized source to an oxygen mask, said valve including: a generally cylindrical body having a fixed partition, said partition dividing the interior of said cylindrical body into first and second chambers, each chamber having an aperture in the wall of said cylindrical body establishing communication between each chamber and the exterior of said body, a disc positioned in said first chamber having means biasing same to close an aperture at an inlet end of said first chamber, a first expansible compensation pressure compartment which includes flexible walls and located in the first chamber, said first compensation pressure compartment having a portion contacting one side of said disc for actuating same to an open position providing flow communication between said inlet aperture and said first chamber wall aperture, a fluid communication line between the interior of said first compensation pressure compartment and the exterior of said body, a closure having a bleed hole therein closing the open end of said second chamber, a second expansible compensation pressure compartment which includes flexible walls and located in said second chamber, said bleed hole being in fluid communication with said second compartment, a venting port in said fixed partition, said venting port establishing fluid communication between the interior of said first compartment and said second chamber, a venting valve having means normally biasing same to close said venting port, said venting valve comprising a stem carried by a rigid plate with said plate contacting and supported by a flexible wall portion of said second compartment, said stem extending through and guided by said partition, one end of said stem carrying a head overlying and normally closing said venting port, said venting valve being actuated by the flexible wall portion of said second compartment to an open position establishing communication between the venting port and the second chamber wall aperture, the effective fluid pressure area of said rigid plate and of the flexible walls of said second compartment which is effective to urge said venting valve to an open position being substantially greater than the area of said head.

2. The valve of claim 1 wherein a compression spring is positioned between said disc in said first chamber and a second disc parallel thereto, said second disc resting on and supported by a flexible wall portion of said first compensating pressure compartment.

References Cited by the Examiner
UNITED STATES PATENTS

| | | | |
|---|---|---|---|
| 2,328,214 | 8/1943 | Holmes | 137—64 |
| 2,711,169 | 6/1955 | Hull | 137—81 |
| 2,828,740 | 4/1958 | Kindred | 128—142 |
| 2,839,054 | 6/1958 | Kindred | 128—142 |
| 2,966,886 | 1/1961 | Perkins | 137—64 |
| 2,985,169 | 5/1961 | Elling | 137—63 X |

ISADOR WEIL, *Primary Examiner.*

J. DEATON, R. GERARD, *Assistant Examiners.*